Aug. 16, 1927.
R. WITTENBERG
FASTENING DEVICE
Filed Jan. 11, 1927
1,639,392
2 Sheets-Sheet 1
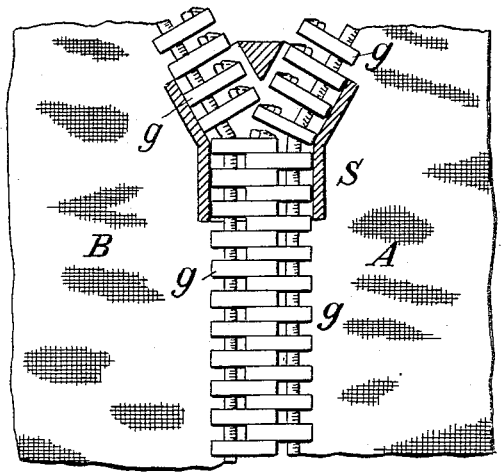
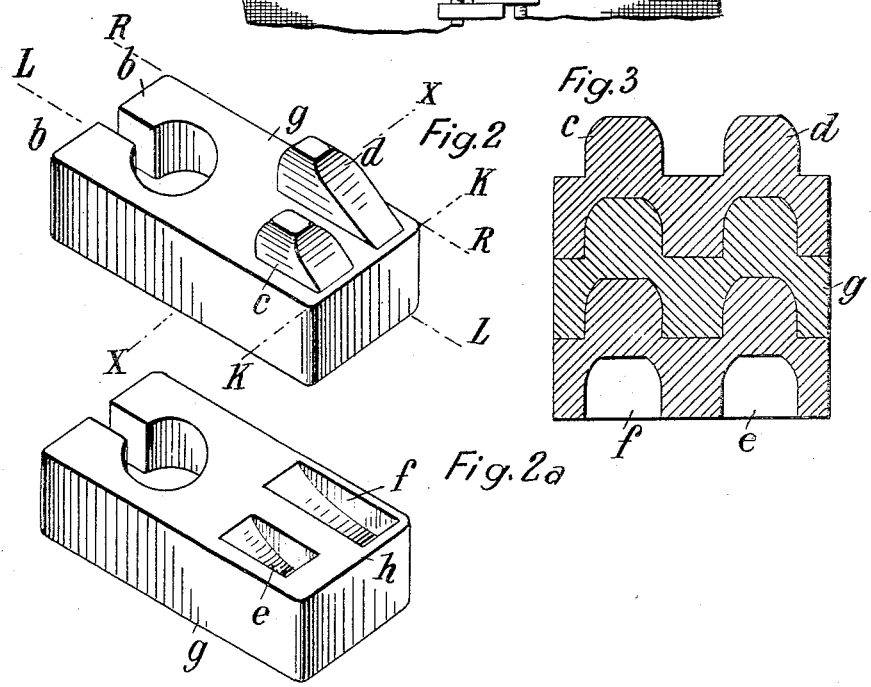

Aug. 16, 1927.

R. WITTENBERG

FASTENING DEVICE

Filed Jan. 11, 1927

Patented Aug. 16, 1927.

1,639,392

UNITED STATES PATENT OFFICE.

ROBERT WITTENBERG, OF BRESLAU, GERMANY.

FASTENING DEVICE.

Application filed January 11, 1927, Serial No. 160,408, and in Germany August 6, 1926.

This invention relates to a fastening device of that type which consists of a number of fastening elements, fixed on the opposite edges of the two parts to be connected, and of a slidable piece designed to be moved along the outer ends of said fastening elements in order to bring the same into engagement. The fastening elements carry on the free ends on the one side projections and on the other side corresponding cavities. The most various shapes for the projections and cavities have been proposed, for instance spherical projections and cup-shaped cavities, comb-shaped elements and oval projections, in order to ensure a certain movability for the fastening. The fastening devices of this type and of known construction present the inconvenience that, when the fastened parts are being bent, the fastening elements detach themselves.

According to the invention two projections are provided on the surface of each fastening element and corresponding cavities in the other side of said element. These projections or cavities have steep side surfaces and the cavities have corresponding steep sides whereby the security of the fastening is considerably increased, the fastening being as flexible as necessary as a certain, although very little, play is provided for the projections and cavities, the sum of the little plays of each of the great number of elements ensuring sufficient flexibility for the most various applications.

As the two projections of each element are displaced the one with regard to the other, and as they are of different dimensions, secure engaging of the one element into the other element is ensured, the more so as, when one of said elements should adopt a position at an angle with regard to the position of the other element, a friction will be produced by this displacement which opposes and stops this displacement so that the fastening device remains securely fastened.

An embodiment of the invention shows the details of the fastening device, partly in much enlarged scale.

Fig. 1 shows the fastening device in elevation, the slidable body being shown in section.

Fig. 2 shows the upper surface of a fastening element in perspective view and on a greatly enlarged scale.

Figures 4, 5:
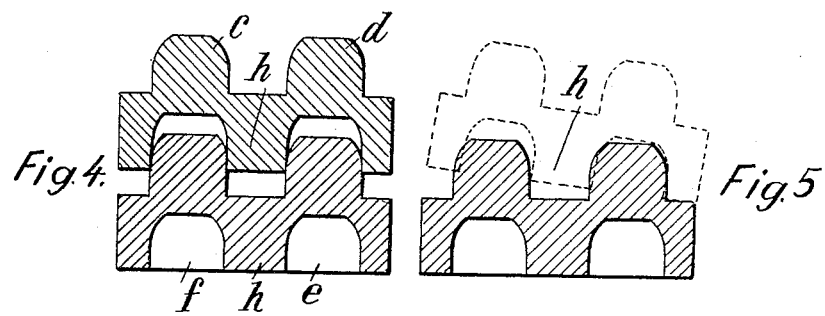

Fig. 2ª is a similar view showing the lower surface of this fastening element.

Fig. 3 shows in cross section through the longitudinal axes of the fastening device and perpendicularly to the plane of the drawing in Fig. 1 (sections on line X—X of Fig. 2) several fastening elements in engagement.

Fig. 4 shows in a similar cross section as that in Fig. 3, two fastening elements which have slightly moved the one away from the other in the direction of the longitudinal axis of the fastening device without coming out of engagement.

Fig. 5 shows in cross section two fastening elements which have been oscillated the one with regard to the other around the edge R—R of Fig. 2, a position which practically could never occur.

Figure 6:
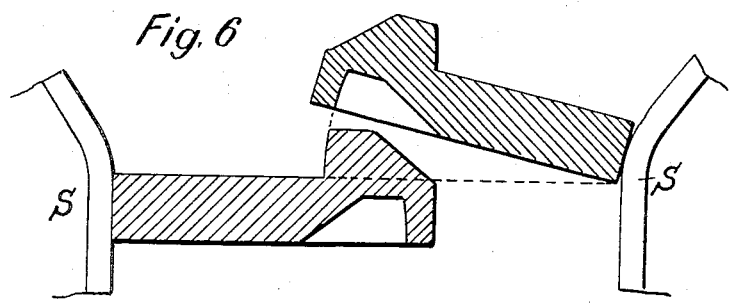
Figure 7:
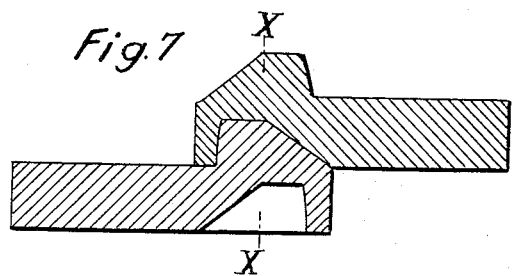

Fig. 6 shows two opposite elements in the position prior to engagement, in a section on line L—L of Fig. 2 and Fig. 7 shows the same elements as Fig. 6 in full engagement.

Figure 8:
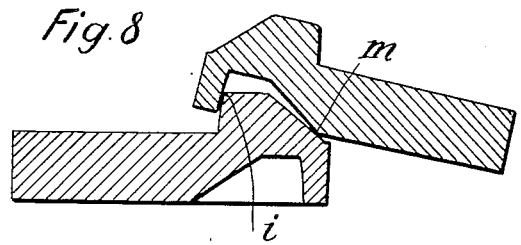

Fig. 8 shows the position of the two elements shown in Figs. 6 and 7 in the position which they assume, when they are oscillated the one with regard to the other around the edge K—K of Fig. 2.

In Fig. 1 the parts A and B to be connected the one with the other have each along the edge a number of fastening elements $g$ which are designed to be brought into engagement the one with the other by the action of a sliding body S, which is shown in section. To better explain the idea of the invention, one single element $g$ is shown in Figs. 2 and 2ª in perspective view on a considerable enlarged scale, Fig. 2 showing the upper surface and Fig. 2ª the lower surface of this element. In the end $b$ of the preferably rectangular element a radial slot is arranged which has a circular enlargement at the inner end so that this end $b$, $b$ forms a kind of clamp. On the upper surface of the fastening element $g$ two teeth or projections are arranged the projection $c$ being of smaller size than the projection $d$, which is displaced with regard to the projection $c$. The coupling teeth or projections $c$, $d$ have almost vertical walls with the exception of the inclined front wall, but they are slightly rounded off at the top edges, in order to facilitate the operation. In the lower surface of the element $g$ two cavities $e$ and $f$ (Fig. 2ª) are provided, the shape of which corresponds to the shape of the projections c, d so that, when the fastening device is being closed as shown in Figs. 1 and 6, the cavities in the lower surface of one element grip over the corresponding projections of the opposite element. In the lower portion of Fig. 1 the fastening elements are shown in Fig. 7 in longitudinal section (on line L—L of Fig. 2) on a much enlarged scale. Fig. 3 shows a cross section through the elements in the fastening position in a cross section along the plane X—X of Figs. 2 and 7. This Fig. 3 illustrates clearly the secure engaging of the projections with the cavities and makes it clear that the vertical side walls of the projections ensure a reliable fastening. The web h between the two cavities prevents any undesired edging of the elements. Owing to the new shape of the fastening elements, it is impossible that two adjacent elements oscillate with regard to one another. An oscillating of one element around the other in lateral direction, for instance around the edge R—R (Fig. 2), is also impossible for the reason that, as shown in dash lines in Fig. 5, the intermediate piece h securely prevents this movement owing to its vertical walls. The distance between two adjacent fastening elements might get longer owing to stretching of the fastening device in the longitudinal direction, but even in this case the engagement of the fastening elements remain ensured within certain limits, owing to the vertical walls of the coupling projections (see Fig. 4). If by any accidental stress to which fastening device might be submitted the elements g should oscillate around the edge K in Fig. 2, the elements would assume the position shown in Fig. 8. The essential is that this movement could be carried out only with considerable friction, as the edge i Fig. 8 of the one element slides under considerable friction along the corresponding surface of the cavity of the other element, and as at the tilting the edge m of the one element slides under great friction along the inclined surface of the projection of the other element. This friction, which prevents the oscillation or tilting of one element with regard to the other, is further increased by the fact that the two projections on one element are of different sizes. In order to make the engaging of the fastening elements more easy, they are made with slight play between the fastening elements so that the engaging of two fastening elements could not be absolutely strong and so, that by the summing up of the many plays of all the elements of one fastening device a sufficient flexibility of the closed fastening device is ensured, there being however no danger that the fastening elements will get accidently disengaged.

I claim:—

A fastening device comprising in combination, a number of fastening elements fixed on the opposite edges of the parts to be fastened, two projections with three substantially vertical walls and one inclined wall on one surface of each fastening element said element having two cavities in the lower surface and corresponding in shape and dimensions with said projections, said projections and said cavities standing at a certain distance the one from the other so that between every two projections a narrow gap and between every two cavities a narrow web is produced.

In testimony whereof I affix my signature.

ROBERT WITTENBERG.